(12) United States Patent
Glejbol et al.

(10) Patent No.: US 6,981,526 B2
(45) Date of Patent: Jan. 3, 2006

(54) ARMOURED FLEXIBLE PIPE AND USE OF SAME

(75) Inventors: Kristian Glejbol, Glostrup (DK); Jan Christian Rytter, Copenhagen S (DK)

(73) Assignee: NKT Flexibles I/S, Brondby (DK)

( * ) Notice: Subject to any disclaimer, the term of this patent is extended or adjusted under 35 U.S.C. 154(b) by 0 days.

(21) Appl. No.: 10/847,745

(22) Filed: May 18, 2004

(65) Prior Publication Data
US 2004/0221907 A1    Nov. 11, 2004

Related U.S. Application Data

(63) Continuation of application No. 09/868,464, filed as application No. PCT/DK99/00706 on Dec. 16, 1999.

(30) Foreign Application Priority Data
Dec. 16, 1998    (DK) ............................... 1998 01650

(51) Int. Cl.
*F16L 11/00*    (2006.01)

(52) U.S. Cl. ...................................... 138/129; 138/135

(58) Field of Classification Search ............... 138/129, 138/130, 135, 136, 150
See application file for complete search history.

(56) References Cited

U.S. PATENT DOCUMENTS

| 1,637,141 A | 7/1927 | Cooper |
| 3,858,616 A | 1/1975 | Thiery et al. |
| 5,813,439 A | 9/1998 | Herrero et al. |
| 6,065,501 A | 5/2000 | Feret et al. |
| 6,253,793 B1 | 7/2001 | Dupoiron et al. |
| 6,354,333 B1 | 3/2002 | Dupoiron et al. |
| 6,415,825 B1 | 7/2002 | Dupoiron et al. |
| 6,840,286 B2 * | 1/2005 | Espinasse et al. .......... 138/135 |

FOREIGN PATENT DOCUMENTS

| WO | WO 8911057 A1 | 11/1989 |
| WO | WO 9100467 A1 | 1/1991 |

* cited by examiner

*Primary Examiner*—James Hook
(74) *Attorney, Agent, or Firm*—Merchant & Gould

(57) ABSTRACT

An armoured flexible pipe has an inner liner (3) surrounded by a pressure armour (5, 6) that is surrounded by a tensile armour (7, 8). The pressure armour (5, 6) is constructed from a number of profiles (5, 6, 10, 11, 12, 14, 14a, 14b, 14c) which may engage with each other. In order to obtain optimum functionality, the profiles are shaped as X profiles (14, 14a, 14b, 14c) which are kept together with another type of profile, e.g. C or T type profiles. In one embodiment, the X profiles have an open channel (17). In this way gas or liquid, such as rinsing fluid, may be pumped through the armour layer, from one end of the pipe to the other end. In particular, the armoured flexible pipe is useful for conveying fluids such as water, ammonia, hydrocarbons, etc.

12 Claims, 5 Drawing Sheets

ARMOURED FLEXIBLE PIPE AND USE OF SAME

CROSS-REFERENCE TO RELATED APPLICATION

This application is a continuation of U.S. patent application Ser No. 09/868,464, filed Jan. 8, 2002, now abandoned, which claims priority of PCT Application Ser. No. PCT/DK99/00706, filed Dec. 16, 1999 based on Denmark Application PA 1998 01650 filed Dec. 16, 1998.

The invention relates to an armoured flexible pipe comprising an inner liner surrounded by a pressure arm our comprising a number of helically wound profiles, on the outside of which a number of profiles are mounted.

The invention further relates to a use of the pipe.

Usually, pipes of the above-mentioned type comprise an inner liner forming a barrier to outflow of fluid conveyed through the pipe.

The inner liner is wound with one or more armour layers which are not chemically bound to the inner liner but may move in relation thereto, thus ensuring the flexibility of the pipe during laying out and operation.

An outer sheath is located outside the armour layers in order to form a barrier to inflow of fluids from the surroundings of the pipe into the armour layers.

In order to prevent the inner liner from collapsing, the inner liner is often lined with a flexible, wound pipe, a so-called carcass.

The above-mentioned type of flexible pipes is used e.g. for conveying liquids and gasses in different depths of water.

In particular, they are used in situations in which very high or varying water pressures are present along the longitudinal axis of the pipe. A riser pipe extending from the seabed to an installation at or near the surface of the sea is an example.

Furthermore, this type of pipe is used between installations located on the seabed at low depths or between installations near the surface of the sea.

Some of the armour layers, particularly those that are used as pressure armour, are most often constructed in such a way that they comprise different metal profiles. When wound with a large angle in relation to the longitudinal axis of the pipe, these profiles will be able to absorb radial forces resulting from outer or inner pressure. Thus, the profiles prevent the pipe from collapsing or exploding as a result of pressure and are thus called pressure-resistant profiles.

As opposed to this, profiles, especially tensile armour wound with a small angle in relation to the longitudinal axis of the pipe, will not be able to absorb radial forces of any significance but will, in contrast, be able to absorb forces exerted along the longitudinal axis of the pipe. This type of profile is called tension-resistant profile.

A problem associated with the use of pressure-resistant profiles is that they are to be mechanically fastened to each other in order to prevent them from being displaced along the longitudinal axis of the pipe, thus destroying the pipe. This mechanical fastening is achieved by designing the profiles in such a way that they are locked mechanically to each other in the spooling process.

In accordance with conventional methods, armour elements are used for the pressure armour, which are not symmetrical in two planes but which are symmetrical in one plane or 180° rotation symmetrical about the mass centre of the profile.

It is an object of the present invention to set out a new geometry of armour elements superior to conventional designs with regard to the operation of the pipe.

The object of the invention is fulfilled by a pressure armour comprising a number of X profiles kept together with profiles of another type.

This type of profile differs from ordinary profile types by being fully or partially symmetrical in two planes substantially perpendicular to each other.

In addition, the new design of the armour elements has a cross section with a higher moment of inertia and hence a higher bending torque than conventional designs.

In this connection it is noted that the X profile differs further from other profiles in that it cannot be used by itself but only together with other profile types which do not contain a double symmetry in two planes substantially perpendicular to each other.

Moreover, for certain X profiles the coupling of force to the nearest similar neighbours is effected through four lines of forces.

On all known profile types, the transfer of force to the nearest similar neighbours is effected through two lines of forces.

The X profile being provided with at least one channel as indicated in claim 5 and the channel in the X profile being suitably located at the side as indicated in claim 6, the channel extending along adjacent edges of the X profile, provide the advantage that fluids may be conveyed in a spiral path along the longitudinal axis of the pipe, which may be established by means of pressurizing media.

As mentioned above, the invention also relates to a use.

In the following, the invention will be discussed in further detail with reference to the drawings, in which:

FIG. 1 shows a usual construction of an armoured flexible pipe with its various layers, FIGS. 2–5 show different examples of the composition of known pressure armour for flexible pipes of the type shown in FIG. 1, FIG. 6 shows a profile according to the invention for use in pressure armour, FIGS. 7 and 8 show embodiments of profile assembly according to FIG. 6, FIG. 9 shows another embodiment of the X profile according to the invention, allowing conveyance of undesired or rinsing fluids in a channel along the winding direction of the profile.

FIGS. 10 and 11 show further embodiments by assembling of specific X profiles, whereas FIGS. 12 and 13 show further embodiments of the X profile.

FIG. 1 shows a pipe comprising an inner liner 3 surrounding a carcass 1 constituted by a helically wound metallic strip 2 forming an inner pipe. During manufacture, the metallic strip 2 is constructed with flaps engaging with each other so that they lock the individual windings of the metallic strip 2 to each other in such a way that the carcass 1 may be bent along its longitudinal direction.

As the inner carcass 1 is not sealed, it has a surrounding inner liner 3 to prevent fluids from flowing into or out of the interior of the pipe.

On the outside of the inner liner 3, one or several layer(s) of profiles 5, 6 forming windings with a large angle in relation to the longitudinal direction of the pipe are helically wound. As a consequence of the large angle, the profiles are primarily capable of absorbing radial forces generated by inner or outer pressure.

Inner pressure occurs during operation of the pipe. Outer pressure is generated partly by hydrostatic pressure of the surroundings and partly by mechanical stress during laying of the pipe.

Thus, the windings form a pressure armour preventing the inner liner 3 from exploding as a consequence of a high pressure on the insider of the pipe or collapsing as a consequence of a high pressure on the outside of the pipe.

Further, as shown in FIG. 1, a tensile armour is provided on the outside of the pressure armour, said tensile armour comprising one or several helically wound layers 7, 8.

An intermediate sheath may be provided between the pressure armour and the tensile armour in order to prevent fluids from migrating between the tensile armour and the pressure armour.

Finally, these layers are surrounded by an outer sheath 9.

However, as the intermediate sheath, the tensile armour and the outer sheath do not relate to the present invention, they will be discussed no further.

Usually, the pressure armour is constructed by a number of interconnected profiles, e.g. as shown in the FIGS. 2–5.

FIG. 2 shows a pressure armour consisting of profiles 5, 6 which are C shaped and which are thus termed C profiles. Here, the interconnection is achieved by two C profiles engaging with each other. In this way, a locking against movement perpendicular to the longitudinal direction of the profile is obtained.

FIG. 3 shows a pressure armour which is coupled together by profiles 10, 11 which are T shaped and which are thus termed T profiles. Here, the coupling together is achieved by two T profiles engaging with each other. In this way, a locking against movement perpendicular to the longitudinal direction of the profile is obtained.

FIG. 4 shows a pressure armour which is coupled together by profiles 12 which are Z shaped and which are thus termed Z profiles. The coupling together is achieved by winding the Z profile in such a way that the upper and the lower locking folds engage with each other, resulting in a locking against movement perpendicular to the longitudinal direction of the profile.

Finally, FIG. 5 shows a pressure armour which is coupled together by two different types of profiles, i.e. C profiles 5 and T profiles 11.

According to the invention, the pressure armour in a first embodiment, as shown in FIGS. 7 and 9, is constructed by X profiles 14 which are coupled together by C profiles 5, 6.

As shown in FIG. 6 in the first embodiment, the X profile itself has four locking folds 16 for engagement with locking folds of profiles of another type.

Since the X profiles are coupled together with C profiles which are arranged symmetrically in relation to the longitudinal symmetry line of the X profile, the X profile is loaded with 4 lines of forces providing a coupling capability so that they are not disconnected as a result of local changes of length of pipe.

FIG. 8 shows a second embodiment of the armour layer, which differs from the embodiment shown in FIG. 7 in that the X profiles 14 are kept together with T profiles 10, 11.

As it will be understood, this construction allows a flow of fluids along the profiles.

A further embodiment of the invention is shown in FIG. 9.

As shown in FIG. 7, the X profiles are again kept together with C profiles 5, 6 in this embodiment. However, the X profile 14a is designed with open channels 17 at the side. The channels 17 extend along a spiral line along the edge of the X profile.

In this way, the free volume between the X profiles forms a continuous channel from one end of the pressure armour layer of the pipe to the other end of the pressure armour layer. This channel may optionally be used for removing undesired fluids or for introducing rinsing fluids in the pipe. The removal may be controlled e.g. by establishing an appropriate pressure difference between the ends of the pipe.

Figure 1:
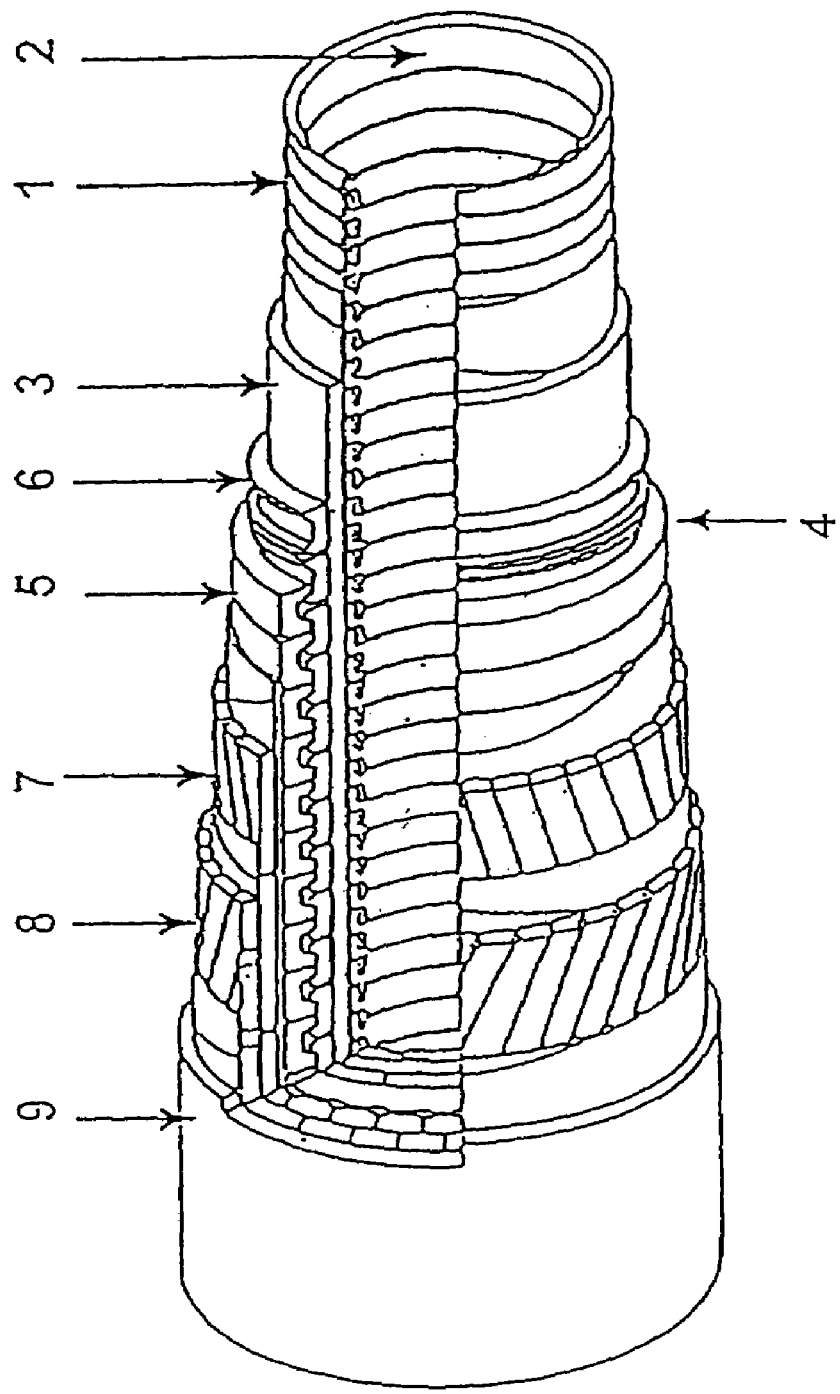
Figure 2:
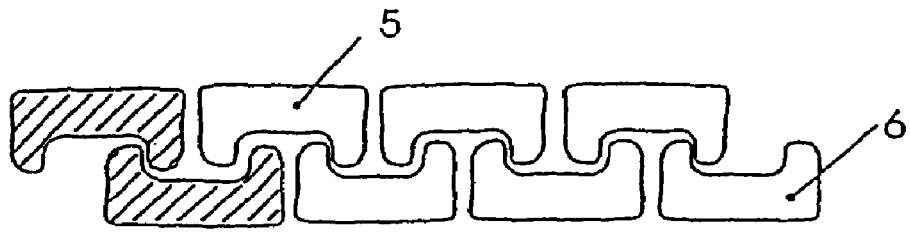
Figure 3:
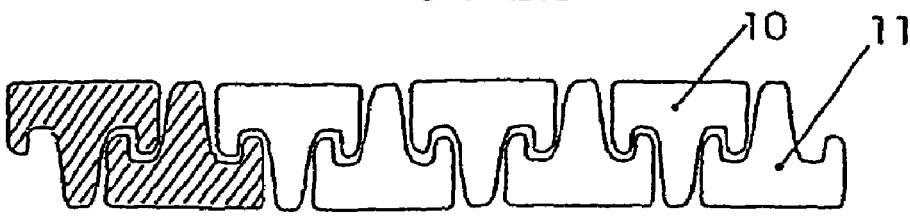
Figure 4:
Figure 5:
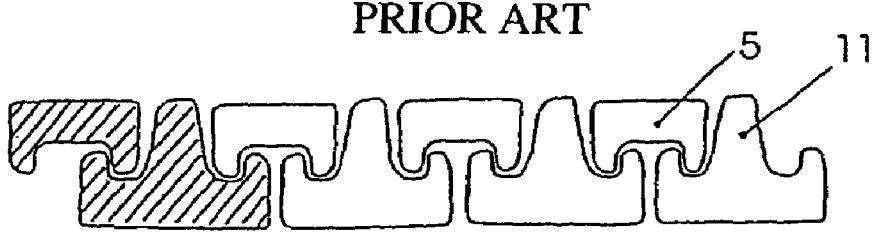
Figure 6:
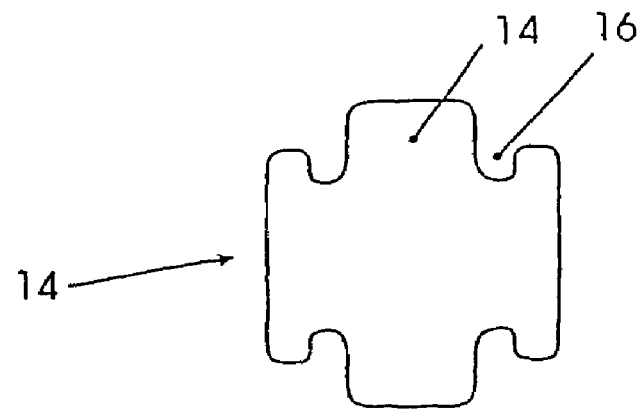
Figure 7:
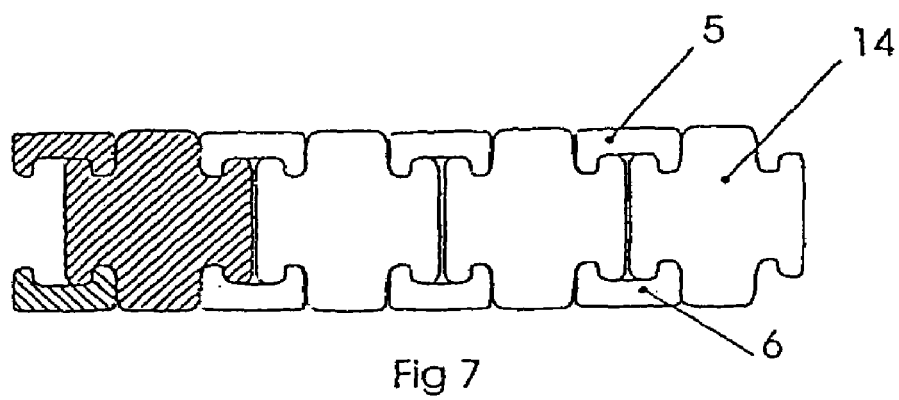
Figure 8:
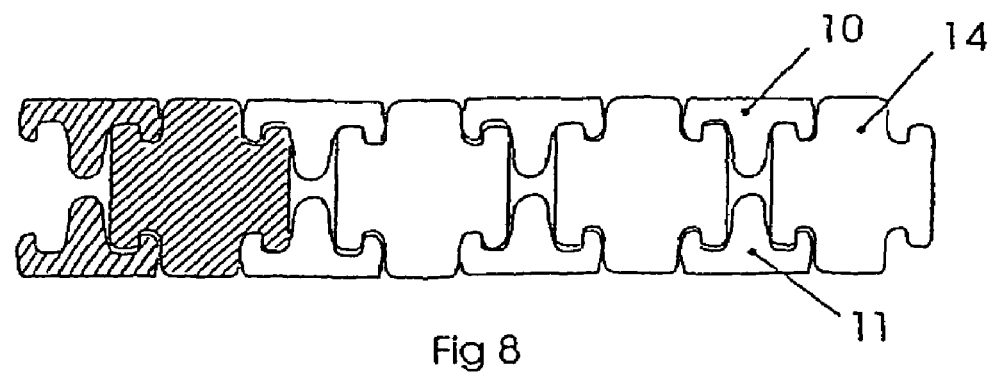
Figure 9:
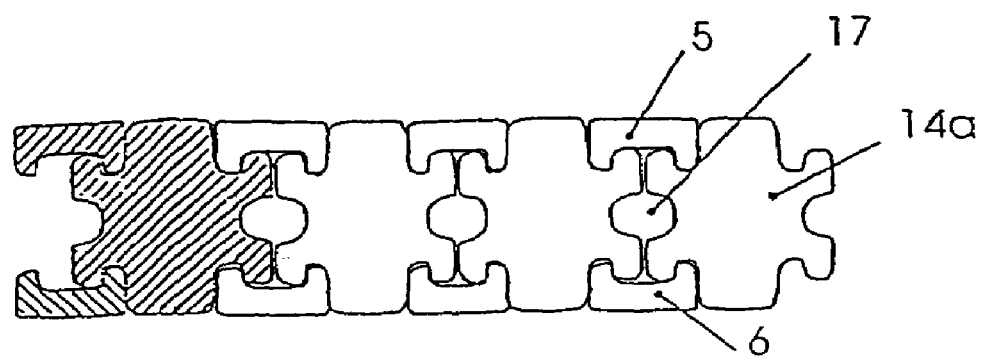
Figure 10:
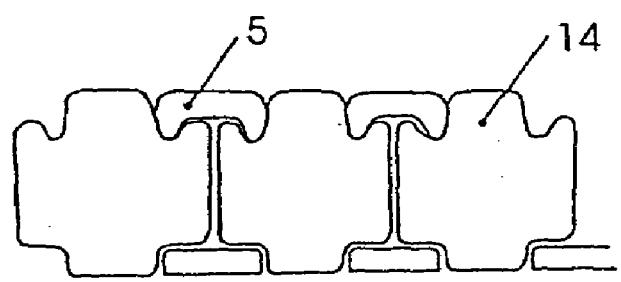
FIG. 10 shows an embodiment of the X profile which is only affected by two lines of forces. Despite the fact that this use of the X profile does not provide optimum mechanical properties, since the two operating lines of forces are not able to absorb to the same extent moments affecting the X profile, this embodiment may be preferred due to ease of manufacturing.
Figure 11:
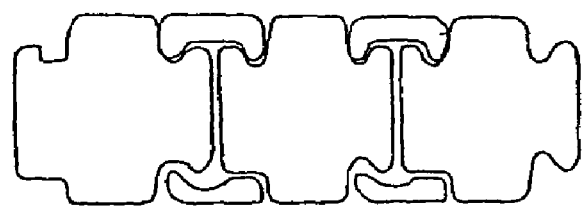
FIG. 11 shows a further embodiment, wherein the lower part of the pressure armour is held in one X profile. The advantage of this embodiment over that shown in FIG. 10 is that the lower strip is controlled in relation to the strength-providing X profile.
Figure 12:
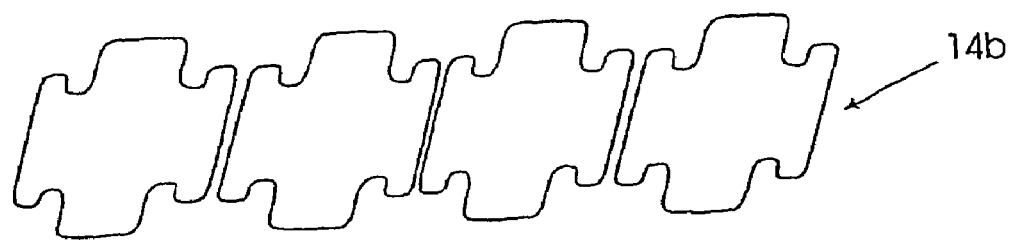
FIGS. 12 and 13 show other embodiments of the X profiles, FIG. 10 showing an X profile 14b which is designed "italic". This profile may of course also be coupled together with fitted C and T profiles.
Figure 13:
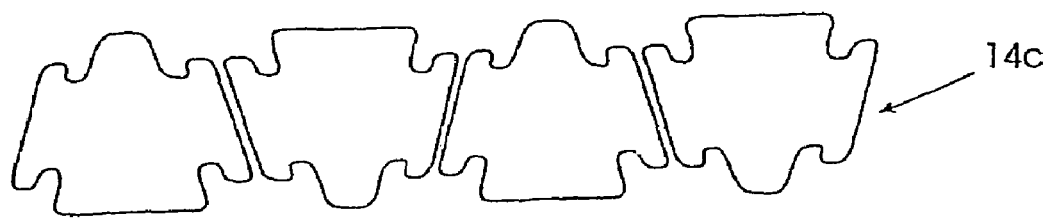

Finally, FIG. 13 shows an embodiment of the X profile 14c, wherein adjacent edges form an angle in relation to the normal to longitudinal axis of the pipe.

It will be understood that the present invention as defined by the claims may be implemented in other ways than those shown above.

Thus, the principles of the invention may be used freely in connection with pipes, in cases in which several of these are coupled together by means of coupling elements, etc.

What is claimed is:

1. An armored flexible offshore pipe comprising;
   an inner liner for preventing fluids from flowing in and out of the interior of the pipe, and surrounded by a helically wound pressure armor;
   the pressure armor comprising a plurality of X-profiles mechanically kept together with profiles of another type;
   each X-profile having opposed edge faces, with the edge faces of adjacent X-profiles directed toward each other;
   each X-profile having an outer face between the opposed edge faces of that X-profile and comprising an outer surface of the pressure armor;
   each X-profile having an inner face comprising an inner surface of the pressure armor;
   each X-profile having at least two locking folds operative for engagement with respective profiles of the other type; and
   the locking folds of each X-profile being located between the edge faces and the outer face of that X-profile.

2. A flexible pipe according to claim 1, characterized in that:
   the other type of profile is a C type profile having an outer face in substantial alignment with the outer faces of the X-profiles and an inner face in substantial alignment with the inner faces of the X-profiles; and
   each other profile comprises two locking folds extending inwardly from the outer face of the other profile to engage respective locking folds of the X-profile adjacent to the respective other profile.

3. A flexible pipe according to claim 1, characterized in that: the other type of profile is a T type profile having an outer face in substantial alignment with the outer faces of the X-profiles and a member extending inwardly from the outer face to lie between edge faces of adjacent X-profiles, so that the member maintains a space between the edge faces of the adjacent X-profiles.

4. A flexible pipe according to claim 1, characterized in that a number of X profiles are kept together by means of twice the number of C profiles and/or T profiles.

5. A flexible pipe according to claim 1, characterized in that an edge face of the X-profile is provided with at least one channel open at the edge face and in substantial alignment with an open channel in the confronting edge face of the adjacent X-profile.

6. A flexible pipe according to claim 5, characterized in that the aligned channels in the confronting X-profiles are between the outer faces and inner faces of the X-profiles so as to form a continuous channel from one end of the pressure armor of the pipe to the other end of the pressure armor.

7. A flexible pipe according to claim 1, characterized in that the pressure armor is of a material which is fully or partially made of a metal, a metal alloy, or a ceramically reinforced metal material.

8. A flexible pipe according to claim 7, characterized in that the material contains at least 50% Fe.

9. A flexible pipe according to claim 7, characterized in that the material is fully or partially made of a polymer or a reinforced polymer.

10. A flexible pipe according to claim 9, characterized in that the material contains more than 20% reinforcing fibres.

11. A use of an armored flexible pipe according to claim 1, for conveying fluids such as water, ammonia and hydrocarbons.

12. An armored flexible offshore pipe as in claim 1, wherein:
   each X-profile has four locking folds, and:
   two of the locking folds of each X-profile are located between the edge faces and the inner face of the X-profile,
   whereby the locking folds engage respective profiles of the other type to form the pressure armor.

* * * * *